United States Patent
Viskic et al.

(10) Patent No.: US 10,801,844 B2
(45) Date of Patent: Oct. 13, 2020

(54) REMEDIATING DISSIMILARITIES BETWEEN DIGITAL MAPS AND GROUND TRUTH DATA VIA DISSIMILARITY THRESHOLD TUNING

(71) Applicant: Uber Technologies, Inc., San Francisco, CA (US)

(72) Inventors: Ines Viskic, Palo Alto, CA (US); Philip Starhill, San Rafael, CA (US); Divya Dalapathi, Sunnyvale, CA (US); Danny H. Chen, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 254 days.

(21) Appl. No.: 16/056,109

(22) Filed: Aug. 6, 2018

(65) Prior Publication Data

US 2019/0204090 A1     Jul. 4, 2019

Related U.S. Application Data

(60) Provisional application No. 62/612,526, filed on Dec. 31, 2017.

(51) Int. Cl.
| | |
|---|---|
| *G01C 21/32* | (2006.01) |
| *G06F 16/29* | (2019.01) |
| *G06F 16/909* | (2019.01) |
| *G06K 9/62* | (2006.01) |
| *G06K 9/00* | (2006.01) |

(52) U.S. Cl.
CPC ............ *G01C 21/32* (2013.01); *G06F 16/29* (2019.01); *G06F 16/909* (2019.01); *G06K 9/00791* (2013.01); *G06K 9/00798* (2013.01); *G06K 9/6215* (2013.01); *G06K 9/6261* (2013.01)

(58) Field of Classification Search
CPC ....... G01C 21/32; G06F 16/909; G06F 16/29; G06K 9/00791; G06K 9/00798; G06K 9/6215; G06K 9/6261
USPC ......................................................... 701/446
See application file for complete search history.

(56) References Cited

U.S. PATENT DOCUMENTS

| | | | | |
|---|---|---|---|---|
| 10,330,479 | B2* | 6/2019 | Loomis | G01C 21/30 |
| 10,406,981 | B2* | 9/2019 | Chundrlik, Jr. | B60R 1/00 |
| 10,533,861 | B2* | 1/2020 | Sambongi | G01C 21/30 |
| 10,635,106 | B2* | 4/2020 | Muto | B60W 30/12 |

(Continued)

*Primary Examiner* — Tuan C To
(74) *Attorney, Agent, or Firm* — Fenwick & West LLP

(57) ABSTRACT

A network system determines and remediates dissimilarities between a digital map and trace data of a road network in an area as service providers and service requesters coordinate service using the road network in the area. To determine dissimilarities the network system can select and convert a digital map, aggregate received trace data into trace data accurately representing the road network in the area, generate a visualization of the dissimilarities, and remediate the dissimilarities using a variety of methods. A first remediation method includes verifying the dissimilarity using a single service provider, a second method includes verifying the dissimilarity leveraging multiple service providers, and a third method modifies the methods used to determine dissimilarities. After remediation, the network system can generate a map of the area that accurately represents the road network in the area.

20 Claims, 12 Drawing Sheets

(56) References Cited

U.S. PATENT DOCUMENTS

| | | | | |
|---|---|---|---|---|
| 2007/0027583 | A1* | 2/2007 | Tamir | G08G 1/164 |
| | | | | 701/1 |
| 2012/0245843 | A1* | 9/2012 | Alasry | G01C 21/26 |
| | | | | 701/446 |
| 2013/0204482 | A1* | 8/2013 | Suyama | G01C 21/005 |
| | | | | 701/28 |
| 2013/0311086 | A1* | 11/2013 | Aoki | G01C 21/005 |
| | | | | 701/446 |
| 2017/0184408 | A1* | 6/2017 | Dong | G01C 21/3492 |
| 2017/0191847 | A1* | 7/2017 | Chintakindi | G06Q 10/0635 |
| 2017/0307396 | A1* | 10/2017 | So | G01C 21/3484 |
| 2017/0314934 | A1* | 11/2017 | Averbuch | G01S 19/50 |
| 2019/0104342 | A1* | 4/2019 | Catalano | H04N 21/4334 |

* cited by examiner

US 10,801,844 B2

REMEDIATING DISSIMILARITIES BETWEEN DIGITAL MAPS AND GROUND TRUTH DATA VIA DISSIMILARITY THRESHOLD TUNING

CROSS REFERENCE TO RELATED APPLICATIONS

This application claims the benefit of U.S. Provisional Application No. 62/612,526, filed Dec. 31, 2017, which is incorporated by reference in its entirety. This application is related to U.S. patent application Ser. No. 16/056,122 titled "Remediating Dissimilarities Between Digital Maps and Ground Truth Data via Map Verification", filed Aug. 6, 2018, which also claims the benefit to U.S. Provisional Application No. 62/612,526, filed Dec. 31, 2017.

BACKGROUND

Field

This description relates generally to determining dissimilarities between maps and ground truth data for a road network and more particularly to remediating dissimilarities using client devices traversing the road network.

Description of the Related Art

Digital maps are often used to provide route guidance. Map data typically includes features such as roads, bodies of water, points of interest, and the like, which are used to render the maps. Map data also typically includes information about how the map can be traversed—for example, a map that includes road networks typically has associated data describing how the road network can be used, including direction of travel (one way, two way), whether turns are permitted at various intersections, etc.

As features such as roads are added to and removed from the road network, and as rules for how the network can be traversed are changed, the map data becomes stale and requires updating to remain effective.

SUMMARY

A network system determines and remediates dissimilarities between a digital map and trace data (i.e., position, velocity, acceleration data, etc.) of a road network in an area as service providers and service requesters coordinate service using the road network in the area. Determining whether trace data accurately reflects the road network in the area and whether the accurate trace data represents a dissimilarity relative to the digital map is challenging when service providers and road networks are highly variable. Thus, subsequent remediation of determined dissimilarities based on the observed trace data such that maps of the road network in the area only include accurate representations of the road network is a difficult problem. Accordingly, the network system remediates dissimilarities between trace data and digital maps by leveraging the large number of service providers and service requesters to verify dissimilarities. In one example, a service provider is a person using an application of their client device to provide travel service using the network system. A service requester is a person using an application of their client device to request travel service using the application.

In one embodiment, the network system can select and convert any number of digital maps into a format that can be compared to received trace data. The network system can store the converted digital map in a datastore.

The network system can access trace data received from service providers traveling the road network in the area and aggregate the trace data into consolidated trace data. The network system analyzes the consolidated trace data to determine which trace data accurately represents the road network in the area and generates a set of ground truth data based on the determination. The network system then accesses a digital map and compares the ground truth data to the digital map to determine dissimilarities between the two. The dissimilarities can include positional and directional dissimilarities. In various embodiments, the network system can use statistical analysis, machine learning, and scoring to determine dissimilarities. The network system stores the dissimilarities in the network system.

The network system can remediate the dissimilarities in a variety of ways. In a first technique, the network system sends a dissimilarity verification request to a client device and receives a dissimilarity verification response in return. The dissimilarity verification obtains information about the dissimilarity such that the network system is able to remediate the dissimilarity and generate a map that accurately reflects the road network.

In a second technique, the network system sends a map verification request to a number of client devices and receives map verification responses in return. A map verification divides the road network into a number of road sub-networks and client devices obtain information about each of the road sub-networks and their included dissimilarities as they travel through the road sub-network. Over time, enough information is gathered from each road sub-network that the network system is able to remediate the dissimilarities and generate a map that accurately reflects the road network. As each sub-network is remediated, the client devices in that road sub-network no longer obtain information about remediated road sub-networks when they travel through them.

In a third technique, the network system remediates the dissimilarities by modifying the methods and techniques used to determine dissimilarities. In this case, network system determines if the number of detected dissimilarities is greater than the number of expected dissimilarities. If the number of detected dissimilarities is greater than the number of expected dissimilarities, the network system modifies the methods and techniques used to determine dissimilarities. For example, the network system can modify a threshold used to determine dissimilarities between the trace data and digital map. Using the modified methods and techniques the network system determines a number of dissimilarities closer to the expected number of dissimilarities.

In some cases, the network system can generate a visualization of the dissimilarities. The network system accesses the determined dissimilarities and converts the dissimilarities into a format that can be represented on a digital map. The network system generates a representation of the dissimilarities that can be displayed alongside the digital map. The network system sends the representation to a client device operating on the road network and the client device displays the representations of the dissimilarities alongside the digital map on the client device. The network system can store the representations and the digital map in the network system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to various embodiments by way of illustration only. It should be noted that from the following discussion, alternative embodiments of the structures and methods disclosed herein will be readily recognized as viable alternatives that may be employed without departing from the principles of what is claimed.

Traditionally, digital maps in a network system can be used to facilitate service coordination between two parties operating client devices within a system environment. For example, a network system may be used to coordinate a transportation service between a provider and a rider. Maps can be used for many purposes, including determining routing information, relative positioning, travel time estimations, fare calculations, etc. Generally, the maps used by network system include a road network representing an area in which the transportation service is being coordinated. These digital maps may be obtained from third parties or created in some other manner. However, the map may have been created inaccurately, and in addition, over time the road network in the environment may change and the digital maps are no longer an accurate representation of that environment. In these cases, trace data from client devices—that is, data representing the actual movement of a client device as it traverses the road network—can be used to determine differences, which we refer to as dissimilarities, between digital maps and the current road network.

Figure 1:
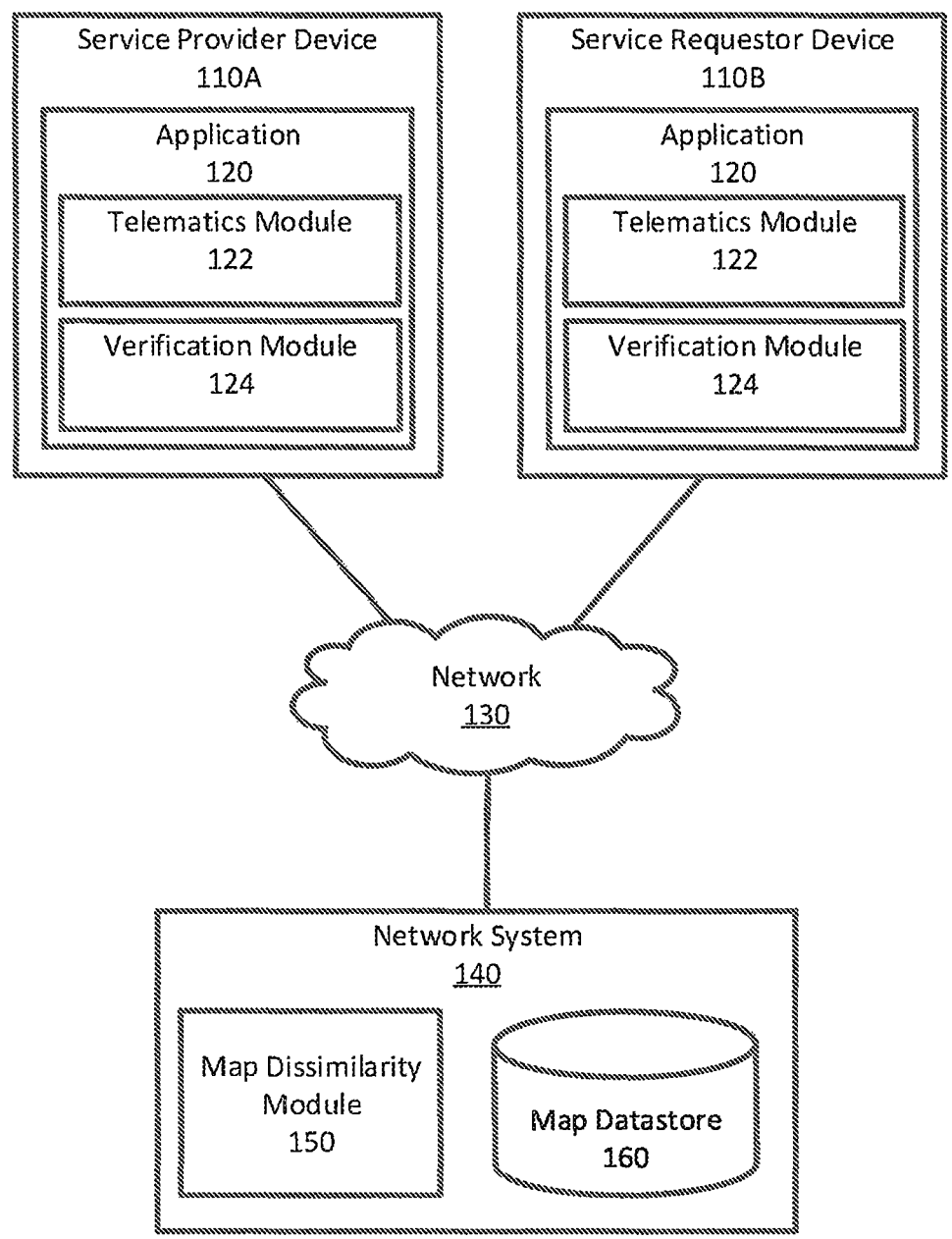
FIG. 1 (FIG. 1) is an illustration of a system environment for remediating dissimilarities between digital maps and ground truth data using a network system, according to one example embodiment.

FIG. 1 is a diagram of a system for determining differences between digital maps and the current road network, according to one embodiment. The system environment includes a service requester device 110A, a service provider device 110B, a network 130, and a network system 140. The service requester device 110A and the service provider device 110 are configured to collect trace data as the devices coordinate service within the environment.

The service requester device 110A and the service provider device 110B include an application 120 including a telematics module 122. Telematics module 122 is configured to obtain trace data as devices 110 coordinate service using the current road network. The trace data can include position, velocity, acceleration, or any other service, geographic, or location-based information. Generally, telematics module 122 gathers trace data from sensors on client devices 110 (e.g., a global positioning system, accelerometers, etc.). In one embodiment, telematics module 122 associates the gathered trace data with the current position of client device 110 as it traverses the current road network and sends the trace data to network system 140. Accordingly, because the trace data depicts actual movement through the road network, it provides a current representation of the road network in the area.

Network system 140 facilitates service coordination between devices using maps of an area. As such, network system 140 includes a map datastore 160 that stores current maps of the road network in the area. In one embodiment, the road network may be represented in the datastore as sets of road segments connected by nodes and identified by coordinates. Further, the road network includes a connection ruleset that defines allowable ways for the road segments and nodes to be connected (e.g., direction of travel, speed, etc.). The road segments, nodes, and connection ruleset, in aggregate, form a representation of a road network in a geographic area which is used to facilitate service coordination by network system 140.

Figure 2:
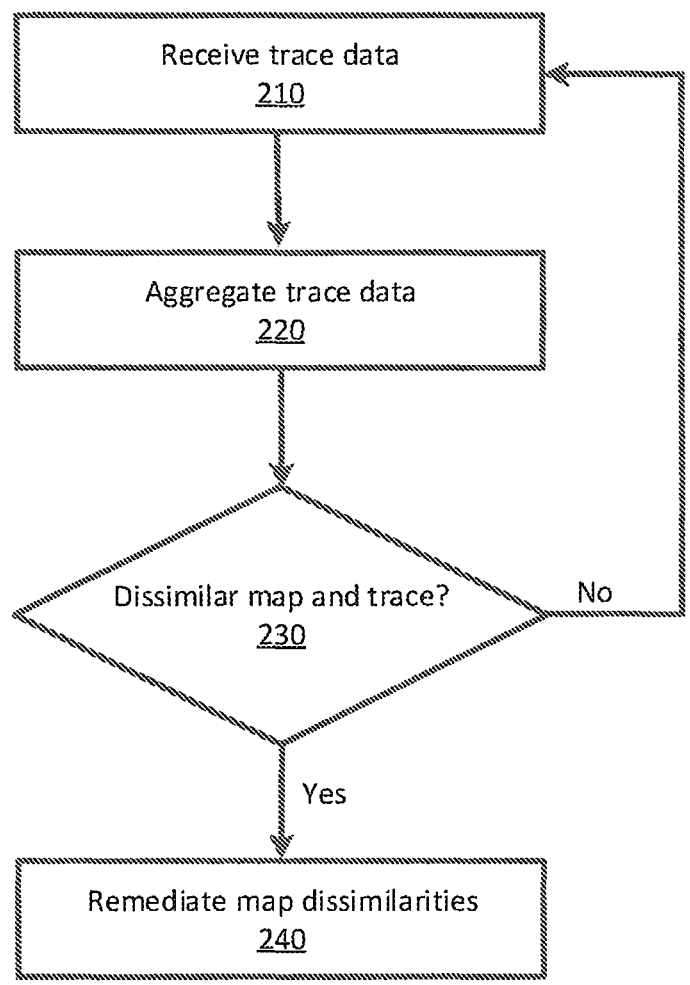
FIG. 2 is a flowchart of a method to determine dissimilarities between received trace data and a digital map and remediate those dissimilarities, according to one example embodiment.

In some cases, trace data received from client devices 110 coordinating service using the current road network is dissimilar from the road network described by the map data of the digital map. In this case, map dissimilarity module 150 of network system 140 determines the dissimilarities using maps stored in the map datastore 160. As an example, FIG. 2 is a process 200 for determining the differences in a road network using trace data received from client devices 110 and a digital map.

To begin, network system 140 receives 210 trace data from client devices 110 in the system environment 100. The trace data includes information representing the road segments and nodes of the current road network in the area. As an example, Chris is coordinating service with Danielle and is traversing the road network using a route based on a digital map provided by network system 140. A recent construction project in the area has started and the provided route is no longer accurate and Chris and Danielle take a detour. As part of normal trace data collection, Chris and Danielle's client devices 110 obtain trace data reflecting this detour and send the trace data to network system 140.

Further, network system 140 aggregates 220 the trace data from client devices 110. Aggregating the trace data from client devices 110 allows network system 140 to determine a likelihood that specific traces of the trace data are anomalous. Similarly, network system 140 can compare the aggregated trace data to the digital map and determine 230 a likelihood that the current road network is dissimilar from the digital map. Continuing the example, the construction project in the area is long-term and many client devices 110 are forced to take detours. Network system 140 determines that the received trace data representing the detour is not anomalous. At any point, network system 140 can store received individual trace data or aggregated trace data in the map datastore 160.

When network system 140 determines that the current and historical road networks are dissimilar, network system 140 can act to remediate 240 dissimilarities using verification module 124 of the application 120 on client device 110. In one embodiment, remediating the dissimilarities can include reobtaining trace data or obtaining images and videos for the dissimilar areas of the road network. For example, Chris' vehicle includes an expanded set of sensors that can obtain trace data and imagery information about the road network. In this case, network system 140 can send a notification to Chris to obtain trace data and imagery information when traversing a road network with a determined dissimilarity.

In some cases, network system 140 systemically determines that dissimilarities are determined incorrectly. In this case, network system 140 can remediate 240 the dissimilarities by tuning a threshold used to determine the likelihood that the current road network is dissimilar from the digital map.

I. System Environment

Returning to FIG. 1, environment 100 illustrates a detailed view of modules within a network system 140 and client devices 100 that enable service coordination, according to one embodiment. Some embodiments of network system 140, and client devices 110 have different modules than those described herein. Similarly, the functions can be distributed among the modules in a different manner than is described herein. As used herein, the term "module" refers to computer program logic used to provide the specified functionality. Thus, a module can be implemented in hardware, firmware, and/or software.

Network system 140 enables service coordination in the environment 100 between client devices 110. Users of network system 140 may include providers that provide a service to other users. In an example use case, a provider operates a vehicle to transport a user from a first location (e.g., an origin or pickup location) to a second location (e.g., a drop-off location). Other types of service include, for example, delivery of goods (e.g., mail, packages, or consumable items) or services. Although the embodiments herein for facilitating service coordination are described with respect to a travel service, the embodiments herein can be applied to any type of service that requires a service coordination via a network system 140.

As an example, network system 140 enables coordinating travel service between users of client devices 110 within the environment 100. In the context of the description, an operator of a transportation vehicle (e.g., the service provider) provides the service of transporting a person (e.g., the service requester) to a destination requested by the person. In one embodiment, transportation vehicles include vehicles such as cars and motorcycles, as well as public transportation vehicles such as trains, light rail, buses, etc. In some cases, the transportation vehicles can be outfitted with a sensor suite that allows the user of client device 110 to obtain information about the road network and environment 100 as it traverses the road network.

Further, a client device 110 can correspond to a mobile computing device, such as a smartphone or can correspond to an onboard computing system of a vehicle. Network system 140 can also correspond to a set of servers and can operate with or as part of another system that implements network services. Network system 140 and client devices 110 comprise a number of "modules," which refers to hardware components and/or computational logic for providing the specified functionality. That is, a module can be implemented in hardware, firmware, and/or software (e.g., a hardware server comprising computational logic), other embodiments can include additional modules, can distribute functionality between modules, can attribute functionality to more or fewer modules, can be implemented as a standalone program or as part of a network of programs, and can be loaded into memory executable by processors.

In one embodiment, the transportation of a person from a starting location to a destination location is referred to as a trip or a transport service. Network system 140 calculates a route from the starting location to the destination location along a set of road segments within the environment based on a digital map of the road segments within the environment. Generally, network system 140 calculates fares for transport services and coordinates those transport services. A fare is a monetary payment from a service requester to a service provider in exchange for the service provider transporting the service requester to a destination location. Network system 140 may calculate the fare for a transport service based on the distance traveled along the route during the trip (and/or based on a duration of the trip, any applicable tolls, fees, etc.). Network system 140 determines the distance traveled during the transport service using geographic information (e.g., telematics data) received from client devices A. (e.g., such as after completion of the transport service).

Network system 140 receives (e.g., periodically) geographic information from a client device 110 included in a transportation vehicle as the transportation vehicle moves its position. The geographic information includes geographic points that describe a trip of the transportation vehicle. In one embodiment, the geographic information is global positioning system (GPS) information. Throughout the description, geographic information is referred to as telematics data or trace data, but the description herein can be applied to any other type of geographic coordinate system.

As shown in FIG. 1, network system 140 is in communication with a service provider device 110A and the service requester device 110B via a network(s) 120. In one embodiment, the network 120 is the Internet or any combination of a LAN, a MAN, a WAN, a mobile, wired or wireless network, a private network, or a virtual private network. While only a single service provider device 110A and a single service requester device 110B are shown in FIG. 1, any number of client devices 110 can be in communication with network system 140 via the network 130. Further, while described as a service requester device 110A and a service provider device 110B, any client device 110 within the environment 100 can include functionality for being a service requester or a service provider.

In one embodiment, the service requester device 110B is an electronic device (e.g., a smartphone) of a person that requested service. The service requester device 110B is used by the person to request a transport service from a starting location to a destination location via a client application 120 included in the service requester device 110B. The client application 120 allows the user of the service requester device 110B to submit a transport service request, which network system 140 then processes in order to select an operator of a transportation vehicle.

According to examples, the transport service request may include (i) a user identifier (ID), (ii) a pickup location (e.g., a location identifier specified by the user or a location identifier of the current position of the service requester device 110B as determined by a telematics module 122 included in the service requester device 110B, (iii) a destination location, and/or (iv) a vehicle type. For example, the telematics module 122 uses sensors (e.g., a GPS receiver) included in the service requester device 110B to determine the position of the service requester device 110A at various instances in time. In one embodiment, the current position of the service requester device 110B is represented by a location identifier such as latitude and longitude coordinates. The current position of the service requester device 110B is also associated with a time stamp indicating the time and the date in which the telematics module 122 measured the current position of the service requester device 110B. Alternatively, the pickup location of the service requester device 110B may be manually inputted into the service requester device 110B by the user of the device, such as by selecting a location on a map or in the form of an address including at least a street number and street name.

The coordination service, which is implemented by network system 140 and/or other servers or systems, can receive the transport service request over the network 130 and can select a service provider for the requester. In one example, the coordination service can (i) identify a pool of service providers that are available to provide the requested service and satisfy one or more conditions (e.g., have the specified vehicle type, and/or are within a predetermined distance or estimated travel time away from the pickup location), (ii) select a service provider from the pool of service providers, and (iii) transmit an invitation to the service provider device 110A. The invitation can include the pickup location so that the selected service provider 110A can navigate to the pickup location for initiating the trip for the requester 110B. If the selected service provider accepts the invitation by providing input on the service provider device 110A, network system 130 can notify the service requester device 110B accordingly.

In one embodiment, the service provider device 110A is an electronic device (e.g., a smartphone) located within the transportation vehicle used to complete trips. The service provider device 110A includes a client application 120. The client application 120 displays, on the service provider device 110A, information about a trip that the service provider has agreed to provide, such as the pickup location, and/or navigation and/or mapping information instructing the service provider to travel to the pickup location. As referred to herein, the pickup location may be the current location of the service requester device 110A or a location specified by the user of the service requester device 110B. The client application 120 may also display, on the service provider device 110A, the destination for the assigned trip if provided by the user of the service requester device. In some examples, a client device 110 can be executing a third party application while still allowing network system 140 to determine dissimilarities between trace data and a map. That is, network system 140 can determine dissimilarities using aggregated trace data and maps from any number or type of applications 120 or client devices 110.

Client devices 110 include a telematics module 122. Telematics module 122 uses one or more sensors of client device 110 to identify trace data from the service provider device 110A and the service requester device 110B. When client application 120 is a travel service coordination application, telematics module 122 can identify GPS data from the transportation vehicle as the transportation vehicle moves along one or more road segments and nodes to complete a trip. The GPS data of the transportation vehicle (or client device 110) represents the transportation vehicle's position at different instances in time during a trip. For example, at time T1, client device 110 can be at a particular GPS location, identified by a location identifier (e.g., latitude and longitude coordinates) and a time stamp indicative of the time and date when client device 110 measured its current position. If the transportation vehicle is moving, at time T2 client device 110 can be at a different GPS location. In this manner, client device 110 periodically measures the current position of the transportation vehicle (e.g., every three seconds, every four seconds, etc.) and periodically provides GPS data that is representative of the position of the transportation vehicle over time to network system 140. Alternatively, client device 110 may provide GPS data whenever new or updated measurements of the current position of the transportation vehicle are taken or are available.

Further, client device 110 include a verification module 124 which facilitates client device 110 or user of client device 110 in remediating dissimilarities between trace data and digital maps in network system 130. Verification module 124 receives verification requests from network system 140 and sends verification responses to network system 140 in response. A verification request requests information about the environment to assist in remediating dissimilarities. A map verification response includes verification information gathered about the environment and provided to network system 140 to assist in remediating dissimilarities. For example, in various embodiments, the verification information can include imagery, LIDAR, additional telematics data, information of the environment provided by the user, or any other obtainable information about the environment.

In some embodiments, verification module 124 is configured to operate in conjunction with normal operation of the client application 120. That is, as service providers and service requesters coordinate service within the environment 100, verification module 124 automatically and dynamically interacts with network system 130 to remediate dissimilarities between trace data and maps in network system 130. In other embodiments, verification module 124 is configured to operate disparately from normal operation of the application 120 (e.g., a "verification mode"). That is, service providers and service requesters within the environment may act to reconcile dissimilarities between maps in network system without engaging in service coordination.

Further, network system 140 includes map datastore 160 and map dissimilarity module 150. Map datastore 160 stores maps of the environment 100 in network system 140. The stored maps can be of any area or region and can include any set of road segments, nodes, and connection rulesets. Further, the map datastore can store any of the metadata and telematics data associated with a map. Maps stored in the map datastore can be in any map format.

Figure 3:
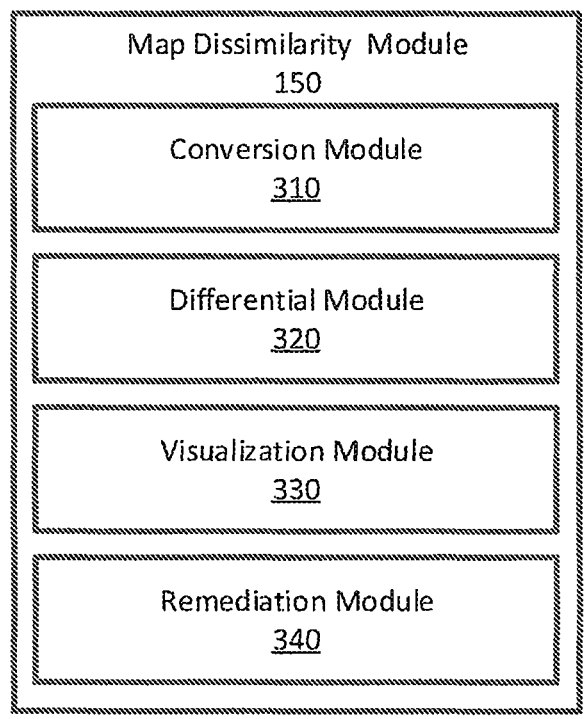
FIG. 3 is an illustration of the map dissimilarity module of the network system, according to one example embodiment.

Map dissimilarity module 150 of network system 140 determines dissimilarities between trace data and maps stored in map datastore 160 and acts to remediate those dissimilarities. Map dissimilarity module 150 is described in more detail in regards to FIG. 3. Map dissimilarity module 320 includes conversion module 310, differential module 320, visualization module 330, and remediation module 340.

Conversion module 310 converts digital maps into a format such that a digital map can be compared to trace data received from client device 110. Conversion module 310 is configured to read, interpret, convert, and store any manner of data types typically associated with storing geographical information in a computer file. For example, conversion module 310 can utilize raster data types such as ADRG, and Esir Grid, vector data types such as GeoJSON, TIGER, or Shapefile, grid formats such as GeoTIFF, SDTS, or any other type of map format. Functionality of the conversion module 310 is described in more detail in regards to FIG. 4.

Differential module 320 determines the dissimilarities between received trace data and digital maps of the area. Functionality of the differential module 320 is described in more detail in FIG. 5.

Visualization module 330 generates a visualization of the determined dissimilarities of the area. Functionality of visualization module 330 is described in more detail in regards to FIG. 6A.

Figure 7:
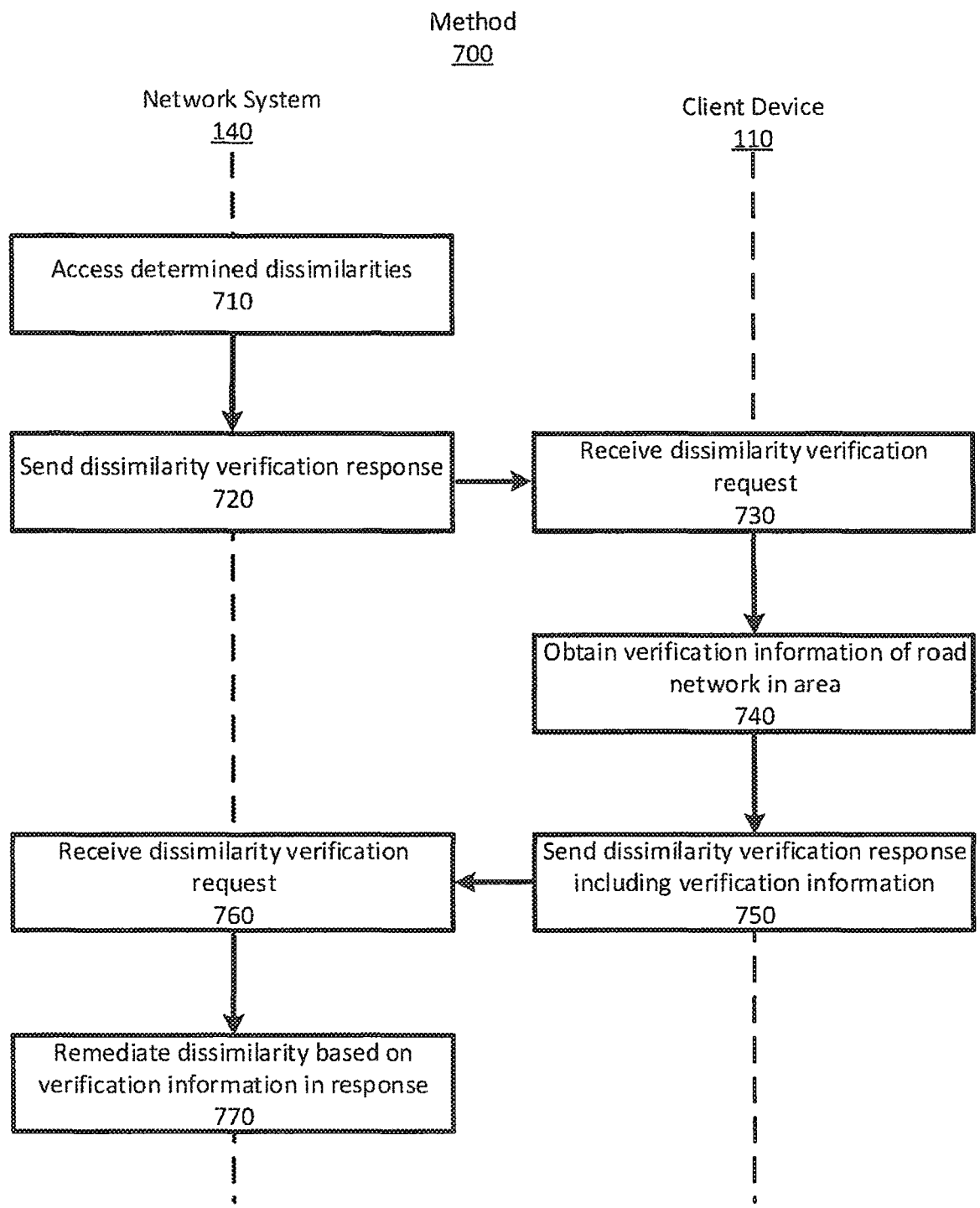
FIG. 7 is a flowchart for a method to remediate dissimilarities using a dissimilarity verification, according to one example embodiment.
Figure 8A:
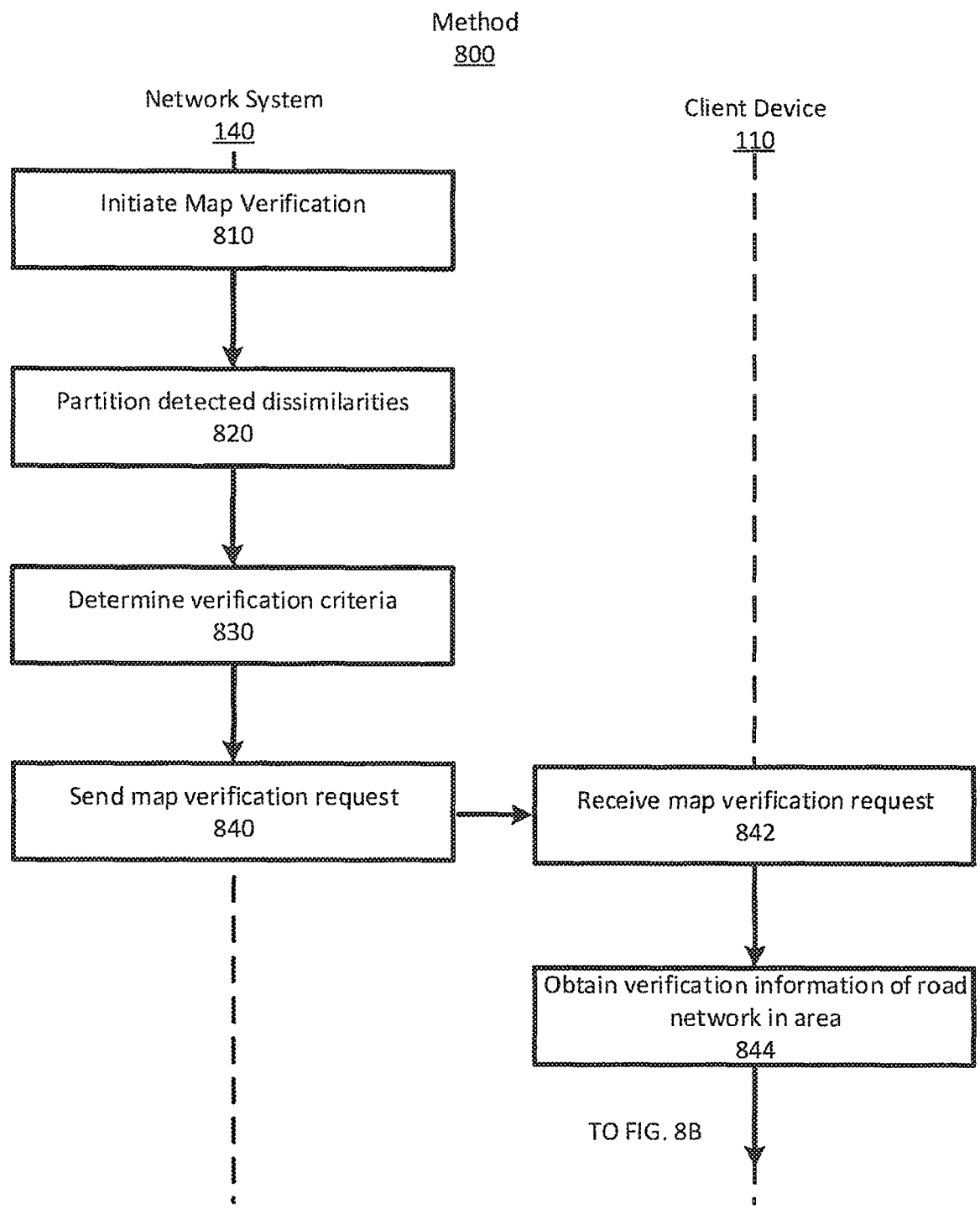
FIGS. 8A and 8B are a flowchart for a method to remediate dissimilarities using a map verification, according to one example embodiment.
Figure 8B:
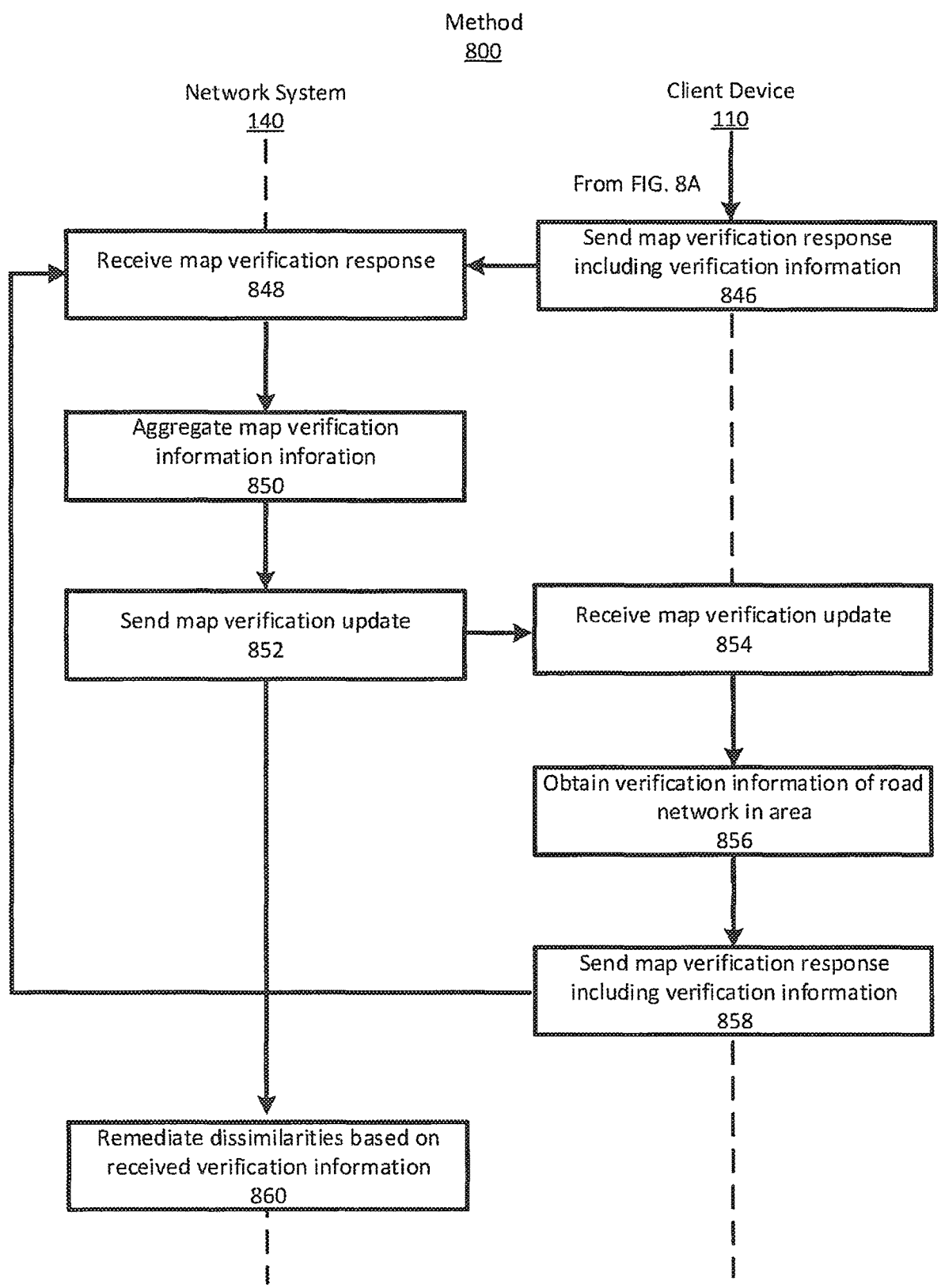

Remediation module 340 acts to remediate dissimilarities in the area. In one approach, remediation module 340 generates a map verification request and sends the map verification request to a client device 110. In response, remediation module 340 receives a map verification response and remediates the dissimilarities based on information in the response. In a second approach, remediation module 340 generates a dissimilarity verification request and sends the dissimilarity request to client device 110. In response, remediation module 340 receives a dissimilarity verification response and remediates dissimilarities between the digital map and the received trace data based on information in the response. In another approach, remediation module 340 modifies methods used by differential module 320 to determine dissimilarities. Functionality of remediation module 340 is described in more detail in regards to FIGS. 7-9.

II. Converting Maps

Conversion module 310 can convert a digital map into a format such that it can be compared to trace data. Alternatively, conversion module 310 can convert trace data into a format such that position information in the trace data can be compared to position information in digital maps. In general, however, conversion module 310 converts either the trace data or the digital map into a format such that network system 140 can determine a dissimilarity between the digital map and the trace data and act to remediate the dissimilarities.

Figure 4:
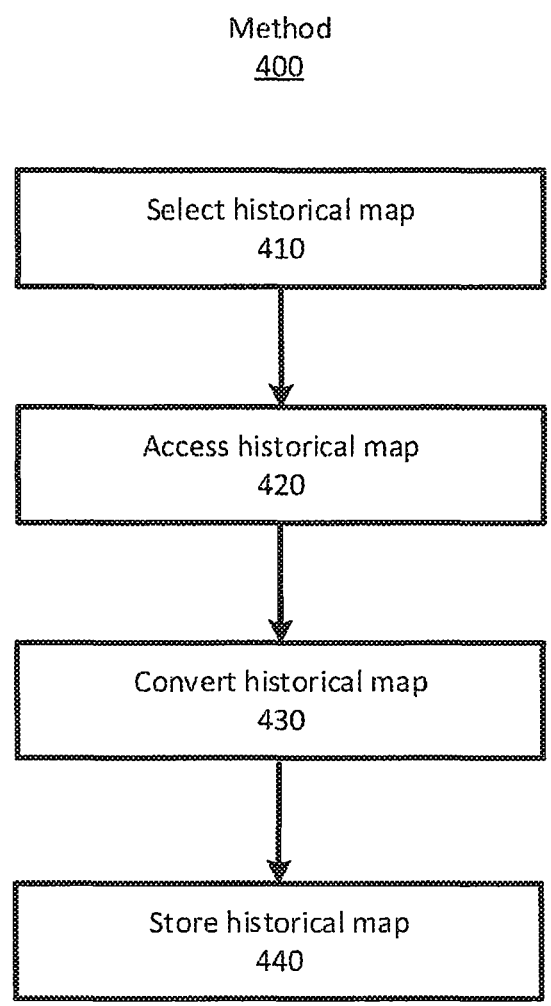
FIG. 4 is a flowchart of a method to convert a digital map into a data format that can be compared to trace data, according to one example embodiment.

FIG. 4 illustrates a flow diagram of a method 400 for converting a map in one format to another format using conversion module 310, according to one example embodiment. Here, for purpose of example, conversion module 310 converts a digital map stored in map datastore 160 into a format that can be compared to trace data received from client devices 110. However, a similar method to method 400 can be employed to convert trace data into a digital map or a digital map in one format to a digital map in another format.

To begin, conversion module 310 selects 410 a digital map to access based on a set of map criteria. The set of map criteria can include, the geographic region of the digital map, the geographic region of the trace data, the accuracy of the digital map, the precision of the digital map, the age of the digital map, the size of the digital map (in area or in storage space), or any other number of criteria. The set of map criteria can be determined by a client device 110, stored on network system 140, determined by an administrator of network system 140, etc. Selecting an appropriate digital map based on the set of map criteria improves the ability of network system 140 to determine dissimilarities and, subsequently, remediate the determined dissimilarities.

Conversion module 310 accesses 420 the selected 410 digital map from map datastore 160 of network system 140. However, in some cases, the conversion module 310 can access the selected digital map from any number of alternate storage locations (e.g., a map server, a client device, etc.).

Using the aforementioned example for context, Danielle is providing a service to Chris in an area in San Francisco, Calif. using his service provider device 110A. Danielle's client device 110B is continuously providing trace data to network system 140 as he transports Chris through the road network in the area of San Francisco. A map of the area in San Francisco, Calif. is stored in the map database 160 of network system 140. However, the stored map data is relatively old and the map criteria stored in network system indicates that the selected map should be the most recent map of the area available. Accordingly, conversion module 310 selects 410 and accesses 420 the most recently updated map of the area in San Francisco, Calif. from a remote map server.

Conversion module 310 converts 430 the accessed digital map into a data format that can be compared to the received trace data. Finally, conversion module 310 can store 440 the converted digital map in the map database for future use by network system 140. That is, each digital map may be stored in the map datastore 160 in any number of formats such that the digital map does not have to be converted each time it is accessed.

Continuing the example, the accessed 420 digital map of the road network of the area in San Francisco, Calif. is stored in the GeoJSON format and the trace data received from Danielle's service provider device 110B is a series of GPS coordinates. The conversion module 310 converts 430 the GeoJSON of the digital map into a set of GPS coordinates representing the road segments and nodes of the road network included in the accessed 420 digital map. As such, both the digital map and the trace data are in a similar format and can be analyzed for dissimilarities by network system 140. The conversion module stores 440 the converted digital map in the map database.

In some cases, the conversion module 310 can aggregate digital maps based on the set of map criteria. Aggregating digital maps can include accessing multiple digital maps, converting the maps into a similar data format, and combining the two digital maps into a single digital map. Aggregating digital maps allows the conversion module 310 to generate a digital map including more information than a non-aggregated digital map.

III. Determining Differences Between Trace Data and Digital Maps

Referring again to FIG. 3, differential module 320 can determine dissimilarities between trace data and digital maps of the area. Generally, a dissimilarity is a difference between trace data accurately representing the area and a digital map of the area. Herein, "unfiltered" trace data refers to the trace data received from devices as they operate in the environment and "ground truth data" refers to analyzed and filtered trace data determined to accurately reflect the road network of the environment.

In various configurations, trace data and digital maps can include both positional and directional information about an area. Positional information can include the location of segments and nodes (i.e., elements) of a road network in an area (e.g., the latitude and longitude coordinates of map elements). Directional information can include the allowable connections between elements of a road network in an area (e.g., allowable turns from one road segment to another road segment, direction of travel on a road segment). Accordingly, dissimilarities can include positional/geometric dissimilarities and directional dissimilarities.

A positional/geometric dissimilarity is a difference in the location and/or shape of a specific element in ground truth data compared to the location of a similar element in the digital map. For example, Market St. in San Francisco, Calif. is a road segment that connects 37° 47'4.517" N and 122° 27'59.88" W to 37° 47'36.627" N and 122° 23'46.833" W in the ground truth data and connects 37° 47'5.632" N and 122° 27'59.88" W to 37° 47'37.128" N and 122° 23'46.833" W in the digital map. In another example, California Street in San Francisco, Calif. is a road segment that is approximately linear in the ground truth data while is a light curve in the digital map. Here, in both cases, a positional/geometric dissimilarity exists between the ground truth data and the digital map. This positional/geometric dissimilarity is described as means of example, positional/geometric dissimilarities can include any of elements in an incorrect position, overlapping elements, duplicated elements, extraneous elements, missing elements, or any other location and/or shape based dissimilarity.

Figure 5:
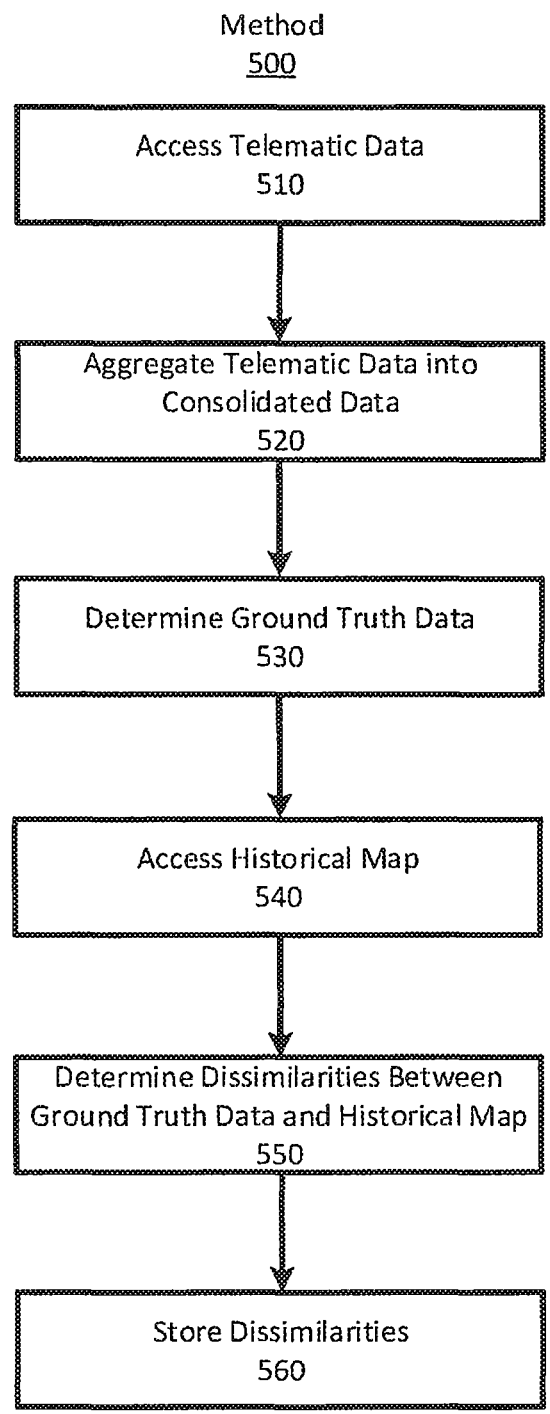
FIG. 5 is a flowchart of a method to determine dissimilarities between ground truth data and a digital map, according to one example embodiment.

A directional dissimilarity is a difference in a specific connection or direction of elements in the connection ruleset of ground truth data compared to the similar connection or direction of elements as defined in the connection ruleset of a digital map. For example, when traveling eastward on California St. in San Francisco, Calif., turning right and traveling southward on Franklin St. is an allowable connection in the ground truth data and is not an allowable connection in the digital map. Thus, a directional dissimilarity exists between the ground truth data and the digital map. This directional dissimilarity is described as means of example, however directional dissimilarities can additionally include a two-way road labeled as a one-way road, a one-way road labeled as a two-way road, a one-way road with a mislabeled direction of travel, an allowed connection defined as disallowed, or a disallowed connection defined as allowed, or any other directional dissimilarity Differential module 320 determines both positional and directional dissimilarities between trace data and a digital map using various techniques. FIG. 5 illustrates a flow diagram of a method 500 for determining dissimilarities using differential module 320, according to one embodiment.

To begin, differential module 320 accesses 530 trace data. The accessed trace data can be any trace data reflecting a road network of an area in the environment. Differential module 320 can access 530 trace data stored in the map datastore 160 or another network system. In some cases, the trace data is received from client devices (e.g., client device 110) as client devices coordinate service and travel through the road network in the area.

Differential module 320 aggregates 520 the accessed 510 trace data into consolidated trace data. That is, differential module 320 aggregates 520 trace data associated with each element of the road network in the area. For example, over time, many service providers using client devices 110 transport requesters by traveling eastward on California Street in San Francisco. Each service provider generates trace data representing California Street and sends that trace data to network system 140. Differential module 320 aggregates 520 the trace data received from service providers into consolidated trace data for California Street in San Francisco. In some configurations dissimilarity module accesses 520 consolidated trace data.

However, in some cases, consolidated trace data does not always accurately represent the road network in the area. For example, while transporting a passenger eastward down California Street, one provider approaches a red stop light, stops, and proceeds to turn right on Gough Street when the stoplight is green. A different provider approaches the red stop light and drives onto Gough Street using a parking lot on the corner of California Street and Gough Street. The trace data reflecting the trips of these two providers are both included in the consolidated trace data. However, the trace data of one provider is an accurate trace (i.e., the trace of the provider that waited at the stop light) while the other trace is an inaccurate trace (i.e., the trace data from the provider who skipped the stop light).

As described above, where trace data differs from map data, the differences may be indicative of inaccurate map data. Prior to comparing trace data with map data, however, it is useful in various embodiments to eliminate from consideration trace data not likely to be accurate—that is, not valid ground truth data. Differential module 320 can determine which traces are accurate and which traces are inaccurate (i.e., trace accuracy) to determine 530 ground truth data using any number of techniques. Differential module 320 can determine different thresholds for determining ground truth data based on the map element, the geographic location of the road network, characteristics of the digital map, characteristics of the road network, etc. In some cases, the thresholds are determined by remediation module 340.

In one example, differential module 320 determines trace accuracy via a statistical analysis of consolidated trace data. For instance, if a trace has less than a threshold likelihood (e.g., 0.1%) of being an accurate trace, the differential module 320 determines the trace is inaccurate. Alternatively, if a trace for an element occurs in less than a threshold number (e.g., 1%) of the traces for that element, differential module 320 determines the trace is inaccurate. Some example statistical methods can include outlier rejection methods, expected value analysis, probability analysis, etc. Inaccurate traces are removed and the accurate traces are aggregated into ground truth data.

In another example, differential module 320 determines 530 trace accuracy and ground truth data using a machine learning model. The machine learning model can be trained on verified trace data, similar road networks, etc. The machine learning model receives the consolidated trace data and generates ground truth data. The machine learning model can be further trained using the generated ground truth data.

In various configurations, differential module 320 determines 530 ground truth data by determining a score (e.g., p-value, confidence score, geometric similarity score, etc.) representing the likelihood that traces are accurate or inaccurate based on a scoring metric when determining trace accuracy. If the score for a trace is above a threshold the score is considered accurate and included in the ground truth data.

Whatever the case, differential module 320 uses only accurate traces from the consolidated trace data (i.e., ground truth data). In some examples, differential module 320 can remove inaccurate traces from the consolidated trace data when generating ground truth data, or, in another example, may tag inaccurate traces and ignore them when generating ground truth data Differential module 320 accesses 540 a digital map of the road network in the area. Generally, the digital map has been converted 430 into a data format that can be compared to ground truth data. Differential module 320 can access 540 a digital map from the map database 160 or from another network system including a digital map of the area.

Differential module 320 determines 550 dissimilarities between the ground truth data and the digital map. Again dissimilarities can include both positional and directional dissimilarities. Differential module 320 determines dissimilarities for the road network of the area using a variety of techniques.

In a first example, differential module 320 compares a position (e.g., coordinates) map element between the ground truth data and the digital map. If the difference in the two positions is greater than a threshold, then the differential module 320 determines 550 that there is a dissimilarity. Differential module 320 can determine different thresholds for determining dissimilarities based on the type of segment, the geographic location of the road network, characteristics of the digital map, etc. In some cases, the thresholds can be provided by the remediation module 350. For example, differential module 320 can use a first threshold when comparing ground truth data to a digital map for an alleyway in the Castro district of San Francisco, Calif., and a second threshold for a highway through farmland in Gilroy, Calif. Further, a dissimilarity can be determined for any portion of a map element. That is, if an element is from A to C, the element can include a dissimilarity from A to B, and no dissimilarities from B to C.

In a similar manner to determining 530 ground truth data from consolidated trace data, differential module 320 can determine 550 dissimilarities using statistical analysis, machine learning, and scoring. Here, however, differential module 320 determines 550 whether or not a given trace, or set of traces, indicate that there is a dissimilarity between the ground truth data and digital map. For example, a digital map indicates that turning left onto Fillmore Street from California Street in San Francisco, Calif. is not allowed. However, 30% of the traces included in the ground truth data indicate that a provider has taken a left turn onto Fillmore Street from California Street. In this case, differential module 320 determines that there is a dissimilarity. In a contrary example, 2% of traces included in ground truth data indicate that a provider has taken a left turn onto Fillmore Street from California Street. Here, these traces could indicate that 2% of providers make an illegal turn onto Fillmore Street from California Street and differential module 320 determines 550 that there is not a dissimilarity. In this case, there are enough providers making illegal turns for those traces to be included in the ground truth data, but not enough traces to indicate that there is a dissimilarity.

Differential module 320 can also characterize the dissimilarities, or any subset of dissimilarities, in a variety of manners. In one example, differential module 320 can generate a score reflecting a degree of dissimilarity between the digital map and ground truth data. In another example, differential module 320 can calculate a dissimilarity density reflecting a density of dissimilarities in a given area of the environment 100. Further, differential module 320 can include the dissimilarity type and dissimilarity location with each dissimilarity.

Differential module 320 stores 560 the determined dissimilarities in map datastore 160 for use by network system 130. Alternatively, differential module 320 can send the dissimilarities and, in some configurations, their characterizations to visualization module 330, remediation module 340, or a different network system.

IV. Visualizing Differences Between Trace Data and Maps

Referring again to FIG. 3, visualization module 330 can create visualizations of the dissimilarities. The visualizations can be created in a variety of manners and provide a visual representation of the various degrees and types of dissimilarities between the digital map and the trace data.

Figure 6A:
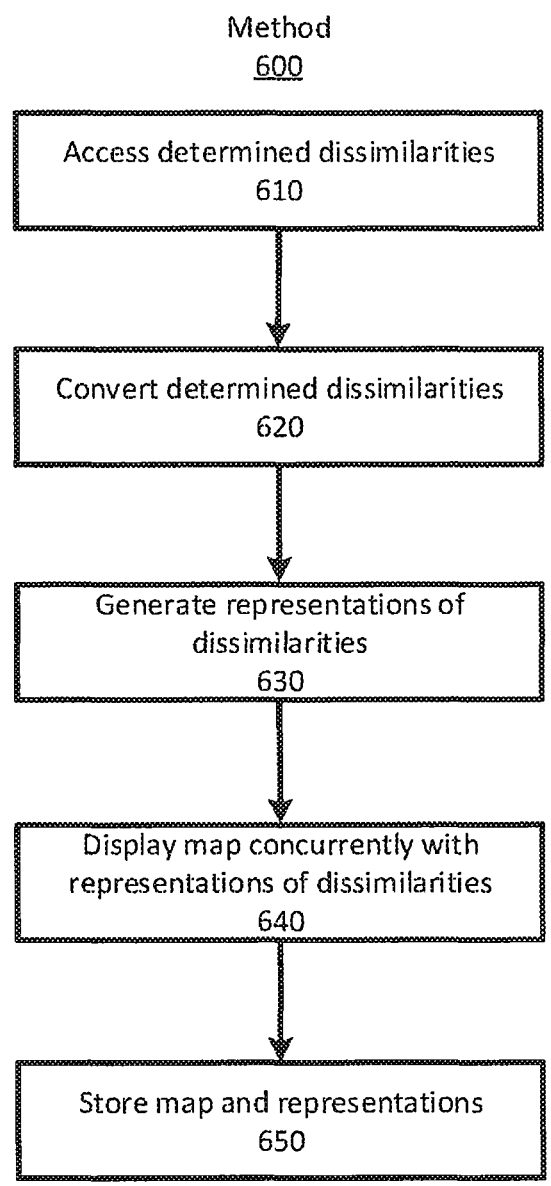
FIG. 6A is a flowchart of a method to generate and display a visualization of dissimilarities alongside a digital map, according to one example embodiment.

FIG. 6A illustrates a flow diagram or a method 600 for creating a visualization of dissimilarities between a digital map and trace data, according to one embodiment. The described embodiment is provided as a contextual example for a particular visualization depicting determined 550 dissimilarities in map elements of a digital map and received trace data. However, the visualization can be based on the type of determined 550 dissimilarities between a digital map and trace data as described herein.

To begin, visualization module 330 accesses 610 determined 550 dissimilarities between a digital map and received trace data. In some embodiments, accessing 610 the determined 550 dissimilarities includes accessing the dissimilarities stored in map datastore 160. However, in various other configurations, accessing 610 determined dissimilarities can include receiving the dissimilarities from client device 110, network system 140, or differential module 320. Further, the dissimilarities can additionally include any other previously determined dissimilarities present in network system 140 (e.g., dissimilarities from other client devices, dissimilarities based on other digital maps, etc.). Generally, the accessed 610 dissimilarities are associated with an area of a digital map.

Visualization module 330 converts 620 the accessed dissimilarities into a data format that can be presented alongside the digital map (i.e., dissimilarity data) on a visual display (e.g., a visual display of a client device 110). In one example, differential module 320 converts 620 dissimilarities into a similar data format as the digital map. However, in some configurations, differential module 320 converts 620 dissimilarities into a data format compatible with the digital map when the dissimilarities and the digital map are displayed concurrently.

Continuing the example, the visualization module 330 accesses 610 dissimilarities between trace data received from Danielle's client device and the digital map from the map datastore 160. Here, the dissimilarities are localized to the area of San Francisco in which Danielle was providing transport to Chris included in the accessed 420 digital map. In this example, the stored 560 dissimilarity data is a set of differential GPS coordinates representing differences between the received trace data and the digital map. Visualization module 330 converts 620 the differential GPS coordinates into dissimilarity data in the GeoJSON format of the accessed 420 digital map. In some cases, the dissimilarity data can additionally include information about the type, degree, location, etc. of the determined dissimilarities.

Visualization module 330 generates 630 visual representations of the dissimilarity data based on a set of visualization criteria. The set of visualization criteria defines how dissimilarity data will be displayed. The set of visualization criteria can be defined by a client device, stored in network system 140, or defined by a network system administrator. As an example, the visualization criteria can include coloring each road segment of the digital map based on degree and/or type of dissimilarity, displaying visual icons in areas where the number of dissimilarities is above a threshold, adding textual overlays in areas where the number of dissimilarities is above a threshold, displaying different line widths or styles of each road segment of the digital map based on degree and/or type of dissimilarity, or any other type of visualization criteria. Generally, the visualizations are generated 530 such that they can be viewed simultaneously to the digital map without significantly occluding the information contained in the digital map. However, in practice, some of the visualization may obscure some information included in the digital map. Whatever the case, visual representations of dissimilarity data present additional information about a digital map when the two are viewed simultaneously.

Continuing the example, several of the map elements traveled by Danielle in the area of San Francisco were dissimilar to their analogous road segments and nodes in the digital map. The differences were converted 620 into a GeoJSON format and the visualization module generates 630 a visualization to represent those differences. In one example, the visualization 330 module generates 630 a heat map overlay for the digital map indicating dissimilarities between roadmap elements. The heat map indicates similar map elements as a first color and highly dissimilar road segments and nodes as a second color. A degree of dissimilarity can be indicated by a range of colors between the first color and the second color. In an embodiment, the generated 630 heat map is configured to overlay the digital map such that heat map is aligned to road segments and nodes of the digital map. That is, the heat map can be aligned to road segments and nodes of the digital map even if portions of the digital map are inaccurate.

Visualization module 330 associates the visualizations with the digital map and stores 650 the visualizations in the map database. In some instances, visualization module 330 sends the visualizations to a client device 110 such that client device can present the visualizations alongside a map of the road network on a display of client device. In other examples, client devices 110 can access the stored 650 visualizations such that they can be displayed on the display of their client device 110 alongside a digital map.

Returning to the example, visualization module 330 stores the heat map in the map datastore 160. Danielle continues to provide service and transport service requesters in the area of San Francisco. While providing service, Danielle's client device 110 receives the heatmap visualization from network system 140 and displays the heat map a display of his client device 110.

Figure 6B:
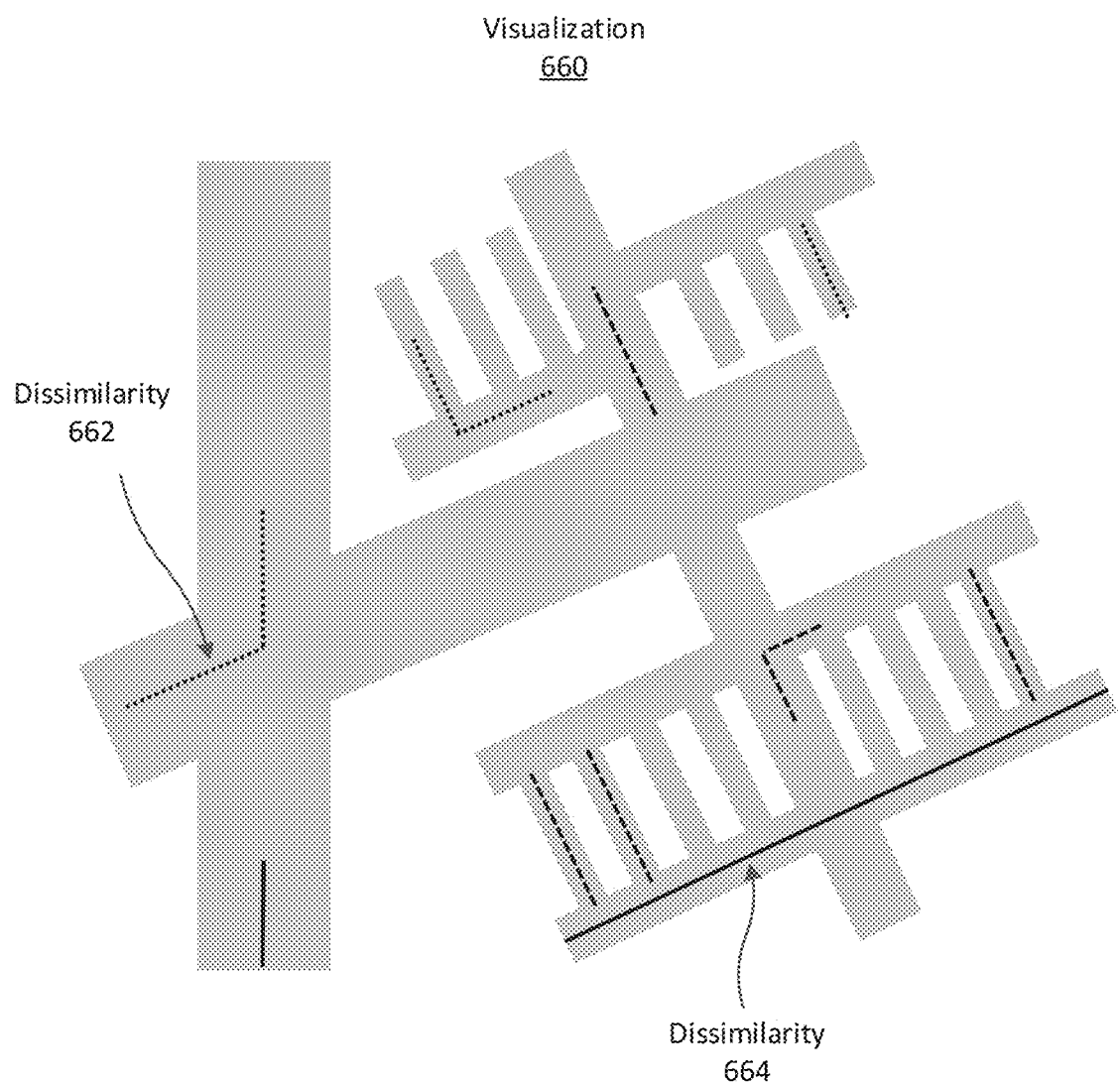
FIG. 6B is an example of a generated visualization of dissimilarities, according to one example embodiment.

FIG. 6B is an example visualization 660 generated by the visualization module 330 to display determined dissimilarities, according to one example embodiment. In the illustrated example visualization 660, the road network on a digital map is indicated by the grey areas. The dissimilarities for various road segments of the road network are indicated by the various dashed lines overlaid on top of the digital map. Each type of dashed line can represent a different type or degree of dissimilarity. For example, one type of dashed line 662 can represent a positional dissimilarity while another type can indicate a directional dissimilarity 664. For example, dissimilarity 662 indicates that there is a directional dissimilarity for the turn between adjacent road segments. Dissimilarity 664 indicates that there is a positional dissimilarity because the road segment is in the wrong location. In various other embodiments, dissimilarities can be indicated by any other shape, color, etc. as described above.

V. Remediating Dissimilarities Between Ground Truth Data and Digital maps

Referring again to FIG. 3, remediation module 340 can act to remediate dissimilarities determined between ground truth data and the digital map. For example, in some cases, the dissimilarity is caused by an accurate digital map and inaccurate trace data, while in other cases, the dissimilarity is caused by accurate ground truth data and an inaccurate digital map. In either case, remediation module 340 determines if the ground truth data or the digital map is accurate and generates a corrected digital map, if needed, in response. The corrected digital map accurately represents the road network in the area.

V. A Remediating Dissimilarities with a Dissimilarity Verification

In one configuration, remediation module 340 acts to remediate dissimilarities by sending a dissimilarity verification request to a client device and receive a dissimilarity verification response in return. FIG. 700 is a flow diagram of an example method 700 for remediating dissimilarities via dissimilarity verification requests and verification responses, according to one example embodiment.

Remediation module 340 accesses 710 determined 550 dissimilarities and sends 720 a dissimilarity verification request to client 110 via network 130. The verification request includes at least one of the accessed 710 determined 550 dissimilarities and its characteristics that can be verified by client device 110 traveling the road network. Verification module 124 of client device 110 receives 720 the verification request. Remediation module 340 can send a verification request to client devices 110 for any number of reasons. In some configurations, remediation module determines if a client device 110 is traveling the road network in the area within a threshold distance of the dissimilarities. Additionally, a system administrator can use remediation module 340 to send a verification request to client devices 110. In some cases, remediation module 340 can include a verification request in the route information of a service provider traveling the road network.

As an example, in one embodiment, remediation module 340 accesses a set of dissimilarities associated with San Francisco from map datastore 160. Remediation module 340 sends 710 a verification request including a dissimilarity and its characteristics to Greg who is operating the application 120 on his client device 110 in verification mode while traveling through San Francisco. The verification module 124 of Greg's client device 110 receives 730 the verification request and provides the dissimilarity and its characteristics on the display of his client device. In this case, Greg's client device 110 displays a map of the area and the location of the dissimilarity and any characteristics relevant to verifying the dissimilarity. For example, Greg's client device 110 may display on a map that a dissimilarity exists at the corner of California Street and Montgomery Street in San Francisco, Calif. Greg's client device 110 additionally displays that the dissimilarity is a directional dissimilarity in which the digital map defines that turning left onto Montgomery Street from California Street is allowed while the ground truth data defines the turning left onto Montgomery Street from California Street is not allowed.

Verification module 124 obtains 730 verification information about the dissimilarity such that the dissimilarity can be remediated by remediation module 340. Verification information can include trace data from client device 110, images of the dissimilarity from client device 110, a report submitted by the user, or any other method of verifying a dissimilarity.

For example, Greg travels the road network to the dissimilarity on the corner of California Street and Montgomery Street. Greg obtains verification information 740 about the dissimilarity by taking an image of the dissimilarity including a sign showing that turning left onto Montgomery Street is illegal. Additionally, network system 140 provides a route for Greg to drive such that when the route is completed, the verification information obtained while traveling the route (e.g., trace data, images of surroundings, etc.) allows the remediation module to remediate the dissimilarity. Further, Greg obtains 740 verification information by filling out a report regarding the dissimilarity.

Verification module 124 sends 750 a dissimilarity verification response including the verification information to the network system 140. Remediation module 340 receives the dissimilarity verification response and associates the included verification information with the dissimilarity. Remediation module remediates 770 the dissimilarity by determining if the ground truth data or the digital map is accurate based on the received verification information associated with the dissimilarity. Remediating 770 the dissimilarity can include generating a new map using the ground truth data and/or digital map determined to be accurate such that the road network is accurately represented on the new map. Generally, the new map includes a connection ruleset that accurately represents the connections of the road network. In other cases, remediating the dissimilarity can include modifying the digital map or connection ruleset of the digital map. Remediation module 340 can store the new (or modified) map in map datastore 160.

For example, Greg sends 750 sends images, trace data, and a report as a dissimilarity verification response to network system 140. Remediation module receives 760 the dissimilarity verification response. Machine vision systems of network system 140 determine that the image of the sign indicates that turning left onto Montgomery Street from Market Street is not allowed and the digital map is inaccurate while the ground truth data is accurate. In another example, differential module 320 accesses 510 the trace data included in the verification information to determine 550 that the ground truth data is accurate. In another example, an administrator of network system 140 reads the report in the verification information and defines that the digital map is inaccurate. Remediation module remediates 770 the dissimilarity by generating a new map indicating that the left turn from California Street to Montgomery Street is not allowed and stores the generated new map in map datastore 160.

In some cases, remediation module 310 can automatically determine that the ground truth data is accurate based on the observed trace data without sending a dissimilarity verification request. For example, if a statistically sufficient amount of ground truth data indicates that the digital map is inaccurate, remediation module can determine that the ground truth data is accurate. In this case, remediation module 310 generates a map including the ground truth data rather than the digital map without sending a dissimilarity verification request to a client device 110.

V. B Remediating Dissimilarities with a Map Verification

Sometimes sending a verification request to client devices (e.g., method 700) may not be an efficient method of remediating 770 determined 550 dissimilarities. In one example, the number of determined 550 dissimilarities in the road network of the area is large and remediating each one individually (e.g., method 700) would require a large amount of time. For instance, in a large city such as San Francisco, Calif., remediating thousands of map dissimilarities using individual verification requests can take a considerable amount of time and effort by users traveling the road network. Therefore, it can be beneficial to remediate dissimilarities by leveraging the aggregate data collection capabilities of client devices 110 travelling the road network in the area.

For example, in one configuration, remediation module 340 can act to remediate dissimilarities by initiating a map verification. Generally, a map verification includes sending a map verification request to client devices traveling the road network and receiving map verification responses in return.

FIG. 800 is a flowchart of an example method 800 of remediating dissimilarities via a map verification, according to one embodiment.

To begin, remediation module 340 initiates 810 a map verification. Initiating 810 a map verification can be based on a variety of factors including a threshold amount of time since the last map verification, a threshold number of detected dissimilarities, an action taken by a system administrator, an observed density of dissimilarities of the road network above a threshold, a new road network without or any method of initiating a map verification.

Remediation module 340 accesses detected 550 dissimilarities of the road network in the area (i.e., network dissimilarities) and partitions 820 the dissimilarities into a sub-network. That is, the network dissimilarities are detected on various map elements in the road network and remediation module 340 partitions 820 the map elements into a road sub-network. Partitioning 820 the map elements into a road sub-network can be based on any number of map criteria. The map criteria can include geographic area of the sub-network, a number of dissimilarities in the sub-networks, the type of dissimilarities, the region of the road network, any other characteristic of the road network, or any other characteristic of the dissimilarities. Each sub-network is associated with a verification status indicating whether the road sub-network has been verified or has not been verified (i.e., unverified) by the map verification.

For example, differential module 320 determines a dissimilarity density of 250 dissimilarities per square mile in San Francisco. Remediation module 340 initiates 810 a map verification because the determined dissimilarity density is greater than a threshold dissimilarity density (e.g., 150/sq. mile). Remediation module 340 partitions 820 the road network of San Francisco, Calif. into road sub-networks, which, in aggregate, form the road network. In this example, remediation module 340 partitions 820 the road network into sub-road networks based on a geographic size of the sub-network. For instance, the road network of San Francisco, Calif. is approximately a 7 mi by 7 mi square and remediation module partitions the road network into approximately 784 0.25 mi by 0.25 mi square sub-networks. Each sub-network can include any number of dissimilarities (e.g., 0, 1, 2, . . . n). In another example, remediation module 340 partitions 820 the road network of San Francisco, Calif. such that each sub-network includes between 3 and 5 dissimilarities. In this case, the road sub-networks can vary in size and shape with some being 1 mi by 1 mi mile squares and others being polygons with a small area. To begin, each road sub-network is associated with a verification status indicating the road sub-network has been verified or has not been verified (i.e., unverified) during the map verification process 800.

Remediation module 340 determines 830 verification criteria for the map verification. Verification criteria is set of information that dictates how a map verification is executed. Generally, for a given road sub-network, the road sub-network is verified once the verification criteria are met. For example, verification criteria can include a baseline threshold indicating an amount (e.g., a number of received map verification responses) of verification information gathered about each map element in a road sub-network in the map verification, a dissimilarity threshold indicating an amount of verification information gathered about each dissimilarity in a road sub-network, a time window indicating an amount of time verification information is gathered about each road sub-network during a map verification. The verification criteria can be further based on a type of dissimilarity to be verified during a map verification, the region of the road network or sub-network, the type of verification information included in a map verification response, or any other criteria based on the characteristics of the dissimilarities and the road network. Each road sub-network can have the same or different verification criteria.

For example, remediation module determines 830 a similar verification criteria for each of the 1024 road sub-networks. The verification criteria defines a baseline threshold representing that verification information about each map element of the road sub-network must be received 10 times, a dissimilarity threshold indicating that verification information about each dissimilarity in the road sub-network must be received at least 20 times, and that only directional dissimilarities will be verified during the map verification. Thus, in a road sub-network without a dissimilarity, the road sub-network is verified after verification information about each map element in the road network has been received 10 times. Similarly, in a road sub-network with dissimilarities, the road sub-network is verified after verification information about each dissimilarity in the road sub-network has been received 20 times in addition to receiving verification information about each map element 10 times.

Remediation module 340 sends 840 a map verification request to client devices travelling the road network in the area. Generally, the map verification request includes the road sub-networks and the verification status of each sub network. Verification module 340 of client devices 110 travelling the road network receive 842 the map verification request. Client devices 110 travelling the road network and, in some cases, providing service in the road network, obtain 844 verification information for the road sub-networks. Multiple client devices travelling the road network can, in aggregate, obtain verification information more quickly than a single client device travelling the road network.

Obtaining 860 verification information can include obtaining images of the road sub-network and surrounding area, responding to questionnaires, gathering additional trace data, or any other method of obtaining verification information about the road sub-network. Different client devices 110 may obtain 860 different types of verification information based on the configuration of client device 110 and transportation vehicle of the user of the client device 110.

For example, remediation module 340 sends 840 a map verification request including the road sub-networks and their verification status to client devices 110 providing service in the road network of San Francisco, Calif. The verification module 124 of client devices receives 842 the map verification request. Here, some client devices 110 obtain 844 verification information of the road sub-networks by taking images of the road sub-network as client devices 110 travel the road sub-network, while other client devices 110 obtain 844 verification information of the road sub-networks by gathering telematics data of the road sub-networks as they are travelled.

Verification module 124 sends 846 a map verification response including the obtained verification information to network system 140 and remediation module 340 receives 848 the map verification response. In various configurations, sending 846 map verification responses can occur in a variety of manners. In example, sending 846 a map verification response can include sending 846 a map verification response every time new verification information about a road sub-network is obtained 844, sending 846 a map verification response once a threshold amount of verification information about a road sub-network or road sub-networks is obtained 844, sending 846 a map verification response based on the network quality (e.g., network speed or type) or any other method of sending a verification response. In some embodiments, sending 846 the map verification response can be continuous or near continuous. Further, in some embodiments, verification information can be stored on a physical storage medium coupled to client device 110 and sending 846 map verification response can include transporting the physical storage medium to a physical location including a portion of network system 140.

For example, client devices 110 travelling the road network in San Francisco, Calif. are obtaining 844 verification information about the road sub-networks as they travel. Client devices 110 obtaining 844 telematics data as verification information send 846 a map verification response every time new telematics data about the road sub-network is obtained 844. Client devices 110 taking images of the road sub-network as verification information store the images on a hard drive coupled to client device 110. A user of client device 110 can transport the hard drive to a location including a server connected to network system 140 and sends 846 a map verification response by uploading the images to network system 140.

Remediation module 340 aggregates 850 the received 848 map verification responses for the road network. For each road sub-network, remediation module 340 aggregates 850 map verification responses into a map verification dataset for that road sub-network. Generally, remediation module 340 aggregates 850 map verification responses until the verification criteria are met for a sub-network. Once the verification criteria are met for a sub-network, verification module 340 changes the verification status for that sub-network from unverified to verified.

For example, client devices 110 send 846 map verification responses including telematics data and images about the road sub-networks to remediation module 340. Remediation module 340 aggregates 850 the received 848 images and telematics data for each road sub-network into a map verification dataset. For a particular road sub-network in the Castro district of San Francisco, Calif., remediation module 340 receives 848 verification information meeting the verification criteria for the road sub-network when aggregated 850. That is, while aggregating 850 map verification responses into a map verification dataset for the particular road sub-network, verification module 350 receives 848 verification information for each map element in the road sub-network 10 times and verification information for each dissimilarity in the road sub-network 20 times. Accordingly, verification module 350 changes the verification status of the particular road sub-network from unverified to verified.

Remediation module 340 sends 852 map verification updates to client devices as the map verification process progresses. Map verification updates include the verification status of each road sub-network and, generally, occurs when the verification status of a road sub-network changes. Verification module 124 of client devices 110 receive 854 the map verification update and update the verification status of the road sub-networks accordingly. Verification modules 124 continue to obtain 856 verification information and send 858 map verification responses when travelling unverified road sub-networks, but do not obtain 856 verification information and send 858 map verification responses when in travelling verified road sub-networks.

For example, remediation module 340 sends 852 a map update to client devices 110 indicating that the particular road sub-network in the Castro district is verified. Thus, as client devices 110 travel through the particular road sub-network verification information is not obtained 856, but verification information is obtained for other road sub-networks.

For each detected dissimilarity, remediation module remediates 860 the dissimilarities by determining if the ground truth data or the digital map is accurate based on the map verification data. Remediation module 340 can determine the accuracies using any of the methods described herein. Remediating 770 the dissimilarity can include generating a new map using the ground truth data and/or digital map determined to be accurate such that the road network is accurately represented in the new map. Generally, the new map includes a connection ruleset that accurately represents the connections of the road network. In other cases, remediating 860 the dissimilarity can include modifying the digital map or connection ruleset of the digital map. Remediation module 340 can store the new (or modified) map in map datastore 160.

Using the map verification process to verify dissimilarities has many potential benefits. First, the map verification process can use less bandwidth as sub-networks that have been verified no longer send map response. Second, the map verification process can take less time because client devices are verifying dissimilarities in aggregate rather than on at a time. Finally, the map verification process can rely on more data to verify a dissimilarity rather than a single set of verification information.

In some configurations, process 900 can be used to generate trace data for method 500. That is the method can be used to obtain trace data of road networks by partitioning the road network into road sub-networks, sending the road sub-networks and their verification statuses to client devices, and obtaining information about the road sub-networks while the sub-network status remains unverified. In this configuration, there may be no dissimilarities in any of the road sub-networks.

V. C Remediating Inaccurate Dissimilarities

While verifying determined dissimilarities is important, sometimes differential module 320 systematically determines 550 dissimilarities inaccurately. In this case, remediating dissimilarities that do not exist can cause network system to unnecessarily use additional bandwidth, processing power, and time. Therefore, in some configurations, remediation module remediates dissimilarities by determining that the differential module 320 is inaccurately determining dissimilarities 500 and acts to improve dissimilarity determination.

For example, using method 500, differential module 320 determines a threshold for determining 550 dissimilarities that is incorrect for the road network in the area. In this case, traces included in ground truth data that accurately represent the road network are, incorrectly, determined 550 to be dissimilarities because the determined threshold is inaccurate. Similarly, ground truth data that does not accurately represent the road network are, incorrectly, not determined 550 to be dissimilarities because the determined threshold is inaccurate. In response, remediation module 340 determines a new threshold such that dissimilarities are more accurately determined by remediation module 340.

Giving a more contextual example, differential module 320 determines a threshold for determining 550 dissimilarities for a road network in San Francisco, Calif. is 0.5 m (e.g., a dissimilarity is determined 550 when the ground truth data is different from the digital map by 0.5 m). During normal operation, service providers routinely vary in position by 1.0 m, and, accordingly, ground truth data includes a variation in position of approximately 1.0 m. Here, the digital map is similar to the ground truth data and differential module 320 should not determine 550 a dissimilarity. However, differential module 320 determines 550 dissimilarities using a 0.5 m threshold and positional variation of 1.0 m in ground truth data causes differential module 320 to inaccurately determine 550 dissimilarities exist where there are none. In response, remediation module 340 determines a new threshold for differential module 320 of 1.3 m such that positional variation do not cause the differential module 320 to determine 550 dissimilarities.

In a counter example, differential module 320 determines a threshold for a road network in San Francisco, Calif. is 7 m. Here, a lane for a road in the road network has recently moved 5 m and the digital map is dissimilar to the ground truth data. However, differential module 320 determines 550 dissimilarities using a 10 m threshold and the 7 m lane movement causes differential module 320 to inaccurately determine 550 that there is not a dissimilarity when one exists. In response, remediation module 340 determines a new threshold for differential module 320 of 5 m such that the lane change causes differential module 320 to determine 550 a dissimilarity.

The preceding examples provide context for differential module 320 inaccurately determining 550 a single dissimilarity in a road network. However, determining that a single dissimilarity is accurate or inaccurate is a complex problem when viewing aggregated trace data. Thus, analyzing dissimilarities in aggregate across a road network to determine if differential module 320 is inaccurately determining 550 dissimilarities is beneficial.

Figure 9:
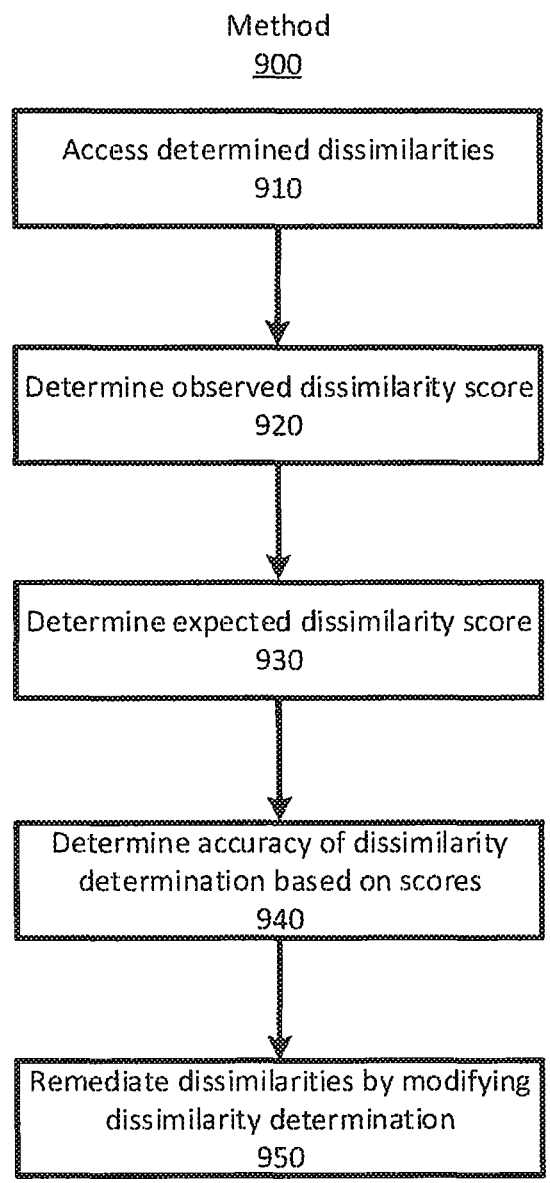
FIG. 9 is a flowchart for a method to remediate dissimilarities by modifying the methods and techniques used in determining dissimilarities, according to one example embodiment.

For example, a road network of a large metropolitan city in America, on average, has approximately 5 dissimilarities per square mile. If differential module 320 determines that there are 15 dissimilarities per square mile (or, contrarily, 0 dissimilarities per square mile) for a large metropolitan city in America, remediation module 340 can determine that dissimilarity module 330 is inaccurately determining dissimilarities and modify the determination process 500 (e.g., generating a new threshold). FIG. 9 illustrates a flow diagram 900 of a method for remediating dissimilarities that do not exist by determining that differential module 320 is inaccurately determining dissimilarities, according to one embodiment.

To begin, remediation module 340 accesses 910 a set of dissimilarities and their characteristics from map datastore 160. Generally, the set of dissimilarities and their characteristics are determined by differential module 320 using method 500. The dissimilarities can include positional/geometric dissimilarities and directional dissimilarities. The characteristics of the dissimilarities can include characteristics of the road network, area, or environment, characteristics of map elements in the road network, dissimilarity types, degree of dissimilarity, dissimilarity distribution, dissimilarity densities, etc.

Remediation module 340 determines 920 an observed dissimilarity score representing a scored distribution of dissimilarities in the road network. The dissimilarity score can include a number of dissimilarities per area, a proportion of dissimilarities, an absolute number of dissimilarities, or any other method or combination of methods to score a density of dissimilarities. As an example, remediation module calculates an observed dissimilarity score for San Francisco, Calif. as 12.7%.

In some cases, the observed dissimilarity score can also be based on any of the characteristics of the dissimilarities. For example, a determined 550 dissimilarity on an alleyway may contribute less to the observed dissimilarity score than a determined 550 dissimilarity on a highway. In another example, different regions (or elements) in the road network can have different dissimilarity scores, and the region (or element) scores can be used to determine the aggregate observed dissimilarity score for the area. Additionally, the observed dissimilarity score can be based on the type and degree of dissimilarity (e.g., a 10 m positional/geometric dissimilarity affects the dissimilarity score to a greater degree than an allowed right turn directional dissimilarity).

Remediation module 340 determines 930 an expected dissimilarity score for the road network representing the expected scored distribution of dissimilarities in the network. Generally, the expected dissimilarity score is based on similar road networks in similar areas as the road network and area in question. That is, the expected dissimilarity score is a dissimilarity score based on a road network with a similar set of characteristics to the road network in question. For example, the expected dissimilarity score for San Francisco is 5.8% and is based on previously observed dissimilarity scores for New York, Houston, and Los Angeles. In other examples, the expected dissimilarity score can be based on any other set of characteristics for the road network (e.g., types of elements, element density, region, etc.).

Remediation module 340 determines 940 if differential module 320 is accurately (or inaccurately) determining dissimilarities based on the observed dissimilarity score and the expected dissimilarity score. In one example, if the difference between the expected dissimilarity score and the observed dissimilarity score is above a threshold remediation module 340 determines 940 that the differential module 320 is inaccurately determining dissimilarities. In other configurations, the determination 940 can be further based on any of the characteristics of the dissimilarities.

Remediation module 340 remediates 950 the dissimilarities (e.g., acting to reduce the number of inaccurate dissimilarities) by modifying differential module 320 based on determination 940. In one configuration, remediation module modifies threshold values used in determining dissimilarities. For example, if the observed dissimilarity score is greater than the expected dissimilarity score (e.g., 12.7% vs 5.8%) remediation module may modify differential module 320 to use a larger threshold when determining dissimilarities such that a subsequent observed differential score is closer to the expected differential score. In various other configurations, remediation module 340 can modify any part of process 500 for determining dissimilarities including thresholds and scoring algorithms used to generate ground truth data, which digital maps are accessed, thresholds and scoring algorithms used to determine dissimilarities, etc. In some examples, remediation module 340 determines dissimilarities based on road segment characteristics. That is, for example, determining a dissimilarity for an alley uses a different threshold than determining a dissimilarity for an avenue. In this case, remediation module can modify any part of process 500 for determining dissimilarities based on segment characteristics. That is, for example, remediation module 340 can modify the threshold for an alley but maintain the threshold for an avenue.

In some cases, remediation module 340 initiates a new determination of dissimilarities using the modified process 500. Remediation module 340 may continue executing method 900 until the observed dissimilarity score is similar (or as similar as it can be) to the expected dissimilarity score.

In some embodiments, map dissimilarity module 150 uses visualization module 330 to display the determined dissimilarities between the trace data and the historical map. In this case, remediation module 340 can analyze the visualization to determine if there is systemic inaccurate determination of dissimilarities. For example, remediation module 340 can use a pattern recognition algorithm to determine that the visualization includes an area of the digital map with a number of dissimilarities greater than the expected number of dissimilarities. In this case, remediation module may modify the process 500 for determining dissimilarities in that area of the historical map.

Remediation module can store any determined observed dissimilarity score, their associated dissimilarities, and associated dissimilarity characteristics in the map datastore for future use by network system.

Figure 10:
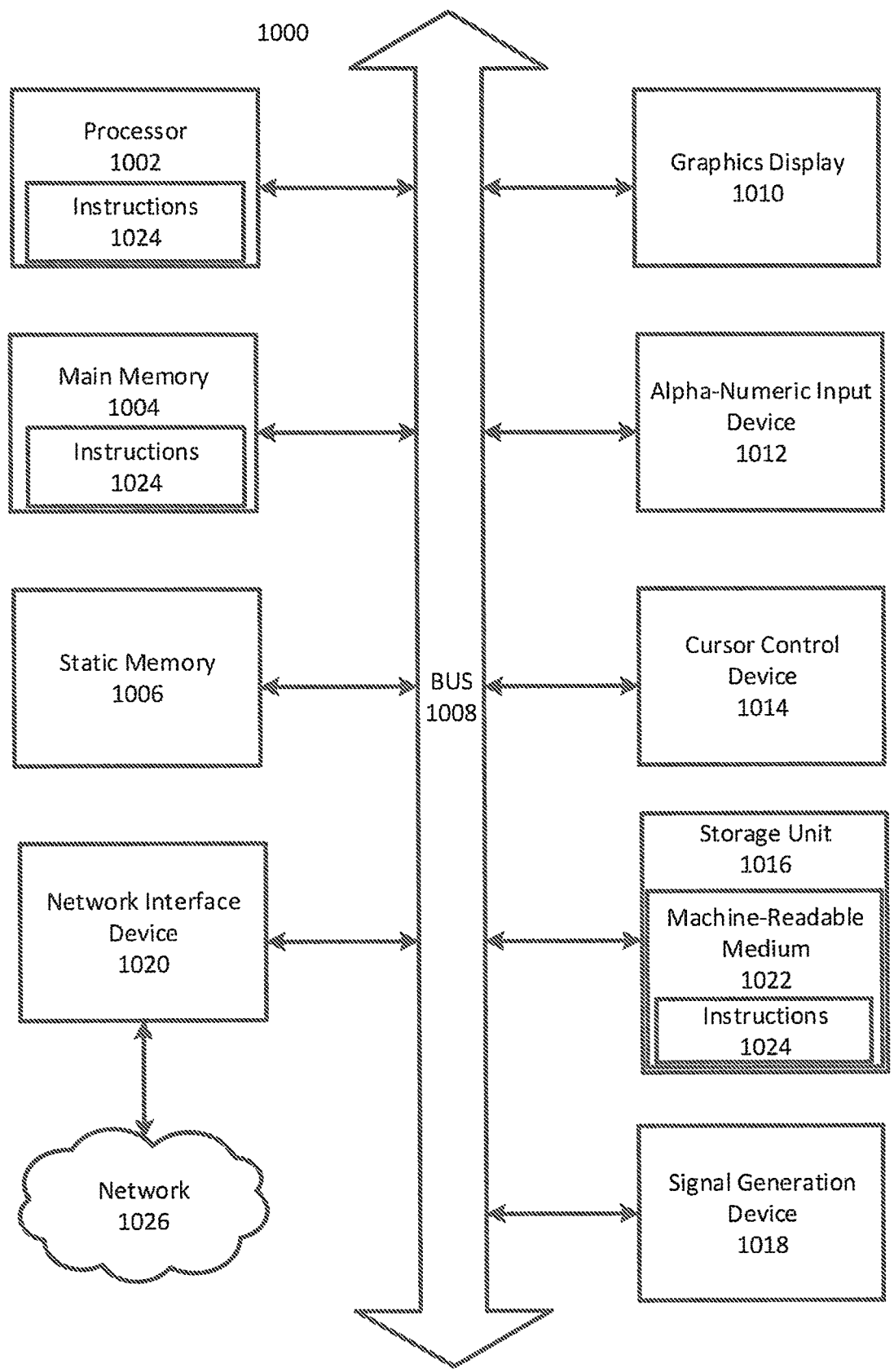
FIG. 10 is an illustration of an example machine for reading and executing instructions from a machine-readable medium, in accordance with some embodiments.

FIG. 10 is a block diagram illustrating components of an example machine for reading and executing instructions from a machine-readable medium. Specifically, FIG. 5 shows a diagrammatic representation of network system 140 and client device 110 in the example form of a computer system 1000. The computer system 1000 can be used to execute instructions 1024 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally processor 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1000 also includes a main memory 1004. The computer system may include a storage unit 1016. The processor 1002, memory 1004, and the storage unit 1016 communicate via a bus 1008.

In addition, the computer system 1006 can include a static memory 1006, a graphics display 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. For example, the instructions 1024 may include the functionalities of modules of the system 130 described in FIG. 2. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

VI. Alternative Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while the present disclosure discusses predicting provider involvement in potential safety incidents, the methods and systems herein can be used more generally for any purpose where one would want to predict involvement in potential incidents using a machine learning model.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-executed method for verifying a digital map data, the method comprising:
    receiving, for each of a plurality of road segments, a set of trace data, each of the trace data in the set collected by a mobile computing device traversing a road segment of a plurality of road segments;
    determining, for each of the plurality of road segments, a dissimilarity score based upon differences between the set of trace data for the road segment and stored map data for the road segment;
    determining, for each of the plurality of road segments, whether the dissimilarity score exceeds a first threshold dissimilarity score;
    responsive to the dissimilarity score exceeding the first threshold dissimilarity score for more than an expected number of the plurality of road segments:
        increasing the first threshold dissimilarity score to form a second threshold dissimilarity score, such that the dissimilarity scores for the plurality of road segments do not exceed the second threshold dissimilarity score for more than the expected number of the plurality of road segments;
        selecting for verification the road segments of the plurality of road segments having a dissimilarity score exceeding the second threshold dissimilarity score; and
    requesting verification of the selected road segments.

2. The computer-executed method of claim 1, wherein the differences between the road segment and the stored map data for the road segment include a difference in position of the trace data of the road segment and the stored map data for the road segment.

3. The computer-executed method of claim 1, wherein the differences between the road segment and the stored map data for the road segment include a difference in direction of the trace data of the road segment and the stored map data for the road segment.

4. The computer-executed method of claim 1, wherein the differences between the road segment and the stored map data for the road segment include a difference in a geometric shape of the trace data of the road segment and the stored map data for the road segment.

5. The computer-executed method of claim 1, wherein the second threshold dissimilarity score is based on a second plurality of road segments similar to the plurality of road segments.

6. The computer executed of claim 1, wherein the second threshold dissimilarity score is based on the area containing the plurality of road segments.

7. The computer-executed method of claim 1, comprising:
    determining a second threshold dissimilarity score for the plurality of road segments, based on a plurality of previously observed dissimilarity scores for similar plurality of read segments.

8. The computer-executed method of claim 1, comprising:
    determining a first threshold dissimilarity score for the plurality of road segments, based on a plurality of previously observed dissimilarity scores for similar plurality of read segments.

9. The computer-executed method of claim 1, wherein the first threshold dissimilarity score is based on a second plurality of road segments similar to the plurality of road segments.

10. The computer executed method of claim 1, wherein the second threshold dissimilarity score is based on the area containing the plurality of road segments.

11. A non-transitory computer-readable storage medium storing instructions, the instructions that when executed by one or more processors cause the one or more processors to:
    receive, for each of a plurality of road segments, a set of trace data, each of the trace data in the set collected by a mobile computing device traversing a road segment of a plurality of road segments;
    determine, for each of the plurality of road segments, a dissimilarity score based upon differences between the set of trace data for the road segment and stored map data for the road segment;
    determine, for each of the plurality of road segments, whether the dissimilarity score exceeds a first threshold dissimilarity score;
    responsive to the dissimilarity score exceeding the first threshold dissimilarity score for more than an expected number of the plurality of road segments:
        increase the first threshold dissimilarity score to form a second threshold dissimilarity score, such that the dissimilarity scores for the plurality of road segments do not exceed the second threshold dissimilarity score for more than the expected number of the plurality of road segments;
        select for verification the road segments of the plurality of road segments having a dissimilarity score exceeding the second threshold dissimilarity score; and
        request verification of the selected road segments.

12. The non-transitory computer-readable storage medium of claim 11, wherein the differences between the road segment and the stored map data for the road segment include a difference in position of the trace data of the road segment and the stored map data for the road segment.

13. The non-transitory computer-readable storage medium of claim 11, wherein the differences between the road segment and the stored map data for the road segment include a difference in direction of the trace data of the road segment and the stored map data for the road segment.

14. The non-transitory computer-readable storage medium of claim 11, wherein the differences between the road segment and the stored map data for the road segment include a difference in a geometric shape of the trace data of the road segment and the stored map data for the road segment.

15. The non-transitory computer-readable storage medium of claim 11, wherein the second threshold dissimilarity score is based on a second plurality of road segments similar to the plurality of road segments.

16. The non-transitory computer-readable storage medium of claim 11, wherein the second threshold dissimilarity score is based on the area containing the plurality of road segments.

17. The non-transitory computer-readable storage medium of claim 11, wherein the computer instructions further cause the processor to:
    determine a second threshold dissimilarity score for the plurality of road segments, based on a plurality of previously observed dissimilarity scores for similar plurality of read segments.

18. The non-transitory computer-readable storage medium of claim 11, wherein the computer instructions further cause the processor to:
    determine a first threshold dissimilarity score for the plurality of road segments, based on a plurality of previously observed dissimilarity scores for similar plurality of read segments.

19. The non-transitory computer-readable storage medium of claim 11, wherein the first threshold dissimilarity score is based on a second plurality of road segments similar to the plurality of road segments.

20. The non-transitory computer-readable storage medium of claim 11, wherein the second threshold dissimilarity score is based on the area containing the plurality of road segments.

* * * * *

UNITED STATES PATENT AND TRADEMARK OFFICE
CERTIFICATE OF CORRECTION

PATENT NO. : 10,801,844 B2  
APPLICATION NO. : 16/056109  
DATED : October 13, 2020  
INVENTOR(S) : Viskic et al.

Page 1 of 1

It is certified that error appears in the above-identified patent and that said Letters Patent is hereby corrected as shown below:

In the Claims

In Column 27, Claim 7, Line 5, delete "read segments." and insert --road segments.--.
In Column 27, Claim 8, Line 10, delete "read segments." and insert --road segments.--.
In Column 27, Claim 10, Line 15, delete "computer executed" and insert --computer- executed--.
In Column 28, Claim 17, Line 30, delete "read segments." and insert --road segments.--.
In Column 28, Claim 18, Line 38, delete "read segments." and insert --road segments.--.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*